(No Model.)
W. CLOUSER.
CASKET TRUCK.
No. 495,474. Patented Apr. 18, 1893.
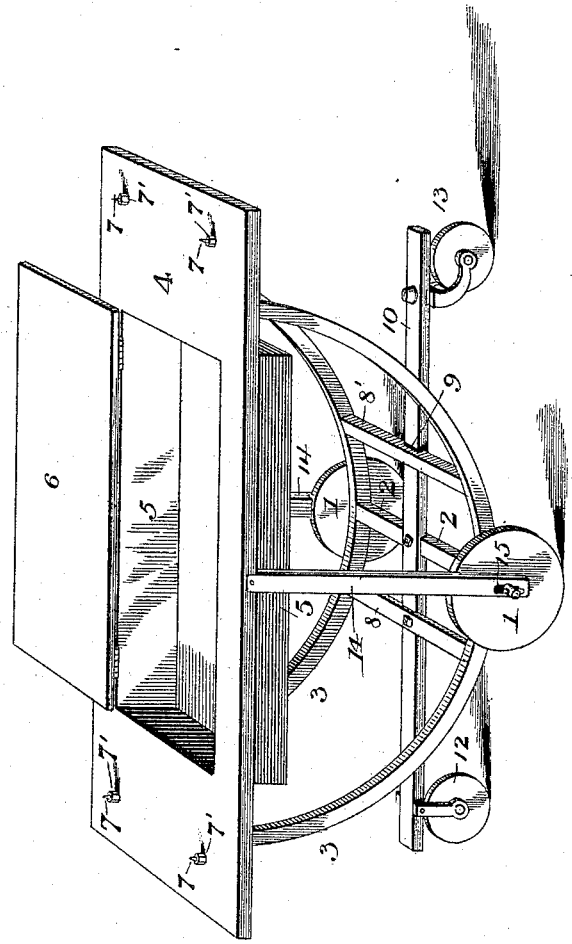
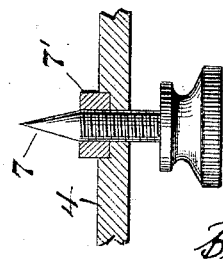
Witnesses:
A. M. Mackerley
O. H. Pommert
Inventor:
William Clouser,
By Eugene L. Arnott,
Atty.
THE NORRIS PETERS CO., PHOTO-LITHO., WASHINGTON, D. C.

UNITED STATES PATENT OFFICE.

WILLIAM CLOUSER, OF GREENFIELD, OHIO, ASSIGNOR OF ONE-HALF TO CYRUS W. PRICE, OF SAME PLACE.

CASKET-TRUCK.

SPECIFICATION forming part of Letters Patent No. 495,474, dated April 18, 1893.

Application filed June 4, 1892. Serial No. 435,560. (No model.)

*To all whom it may concern:*

Be it known that I, WILLIAM CLOUSER, a citizen of the United States, residing at Greenfield, in the county of Highland and State of Ohio, have invented a new, useful, and Improved Casket-Truck, of which the following is a specification, reference being had to the accompanying drawings, in which—

Figure 1 is a perspective view of a casket truck embodying my improvements, and Fig. 2 is a sectional detail showing the arrangement of the adjustable pins.

The main wheels 1 1 of the truck are mounted on the spindles of axle 2, in the usual manner. Spring-bows 3 3, which support the bed-board 4 at their upper ends, are firmly secured to axle 2. The bed-board 4 has a large central opening, beneath which a box 5, designed for containing undertakers' supplies, and provided with a lid 6, is depended. The bed-board 4 is provided with plugs or elevations 7' 7' which project slightly above the bed-board, as shown, and are designed to support a casket and thus prevent wear or injury to the face of the bed-board or the fabric placed thereon. Pins 7 7, which are designed to hold the casket against lateral displacement, extend up through the bed-board 4 and plugs 7' 7'. These pins should be adjustable in height, and for this purpose I prefer to use thumb-screws with sharpened points, as shown most clearly in Fig. 2. These thumb-screws may be easily adjusted in height, as will be readily understood. Two cross-bars or braces 8 and 8' are secured to spring-bows 3 3. The spring-bar 10, which extends longitudinally with the truck midway between the wheels 1 1, is rigidly secured to axle 2 and to cross-bar 8. Between cross-bar 8' and spring-bar 10 a spring 9 is placed. This spring consists preferably, as shown in the drawings, of a block of india rubber. Spring-bar 10 is provided at one end with a small supplementary wheel 12, which ordinarily does not touch the floor, and at the other end with a caster or swivel wheel 13. The wheels of my improved truck are so placed that the weight of the casket is more evenly divided than heretofore between wheels 1, 1 and 13, and by this arrangement the objectionable rocking or seesawing upon wheels 1 1, which heretofore has been observed in trucks of this class, especially upon encountering an obstacle, such as a carpet strip, for instance, is entirely obviated. The guards or braces 14 are secured at their lower ends upon the spindles of axle 2, and at their upper ends to the bed-board 4, and they are slotted at their lower ends at 15, where they receive the spindles of axle 2, in order to permit of vertical reciprocation and hence not interfere with the free action of spring-bows 3 3. With the construction shown, the weight of bed-board 4, and of the casket (not shown in the drawings) to be placed on said bed-board, is supported by wheels 1 1 and 13. The spring-bows 3 3, the spring 9, and the spring-bar 10 completely absorb vibration, thus giving to the truck an easy and almost noiseless motion. The spring-bar 10 is placed longitudinally with the truck and the ends of said spring-bar are more distant, respectively, from axle 2 than are the cross-bars 8 and 8', as shown in the drawings. By this arrangement, and with the weight of the truck resting normally upon wheels 1 1 and 13, I secure the proper spring-action of spring-bar 10. However, spring-bar 10 may extend only from cross-bar 8 to cross-bar 8', or from axle 2 to cross-bar 8', as may be desired, and in this case swivel wheel 13 will be placed directly under cross-bar 8', or between cross-bar 8' and axle 2.

Having thus described my invention, what I claim as new, and desire to secure by Letters Patent, is—

1. The combination, in a casket truck, with the bar 10 extending longitudinally with the truck, of a spring 9 forming a spring-connection between said bar and truck, for the purpose specified, substantially as described.

2. The combination, with the bed-board the wheels 1 1, the axle 2, and the cross-bars 8 and 8', of the spring-bar 10 secured to said axle and to cross-bar 8, and having a spring-connection with cross-bar 8', substantially as set forth.

3. The combination, with the bed-board the wheels 1 1, the axle 2, bows 3 3 secured to said axle, and cross-bars 8 and 8' secured to said bows, of the spring-bar 10 secured to said axle and to cross-bar 8, substantially as set forth.

4. The combination, with the bed-board the wheels 1 1, the axle 2, bows 3 3 secured to said axle, and cross-bars 8 and 8' secured to said bows, of the spring-bar 10 secured to said axle and to cross-bar 8, and an india rubber spring 9 placed between cross-bar 8' and spring-bar 10, substantially as set forth.

5. The combination, with the bed-board 4, of the box 5 depended beneath said bed-board, the bows 3 3 which support said bed-board, the cross-bars 8 and 8' secured to said bows, and the spring-bar 10 secured to one of said cross-bars and having a spring-connection with the other cross-bar, substantially as set forth.

6. The combination, with the bed-board 4, the bows 3 3 which support said bed-board, and the cross-bars 8 and 8' secured to said bows, of the spring-bar 10 having a caster or swivel wheel 13 at a point more distant from axle 2 than is the cross-bar 8', for the purpose set forth, substantially as described.

7. The combination, with the bed-board 4, the bows 3 3 which support said bed-board, and the cross-bars 8 and 8' secured to said bows, of the spring-bar 10 having a caster or swivel wheel 13 at a point more distant from axle 2 than is the cross-bar 8', for the purpose specified, and a spring 9 placed between said cross-bar 8' and said spring-bar, substantially as set forth.

8. The combination, in a casket truck, with the bed 4, of a spring-bar 10 having a caster or swivel wheel 13 and a bearing between said spring-bar and bed at a point nearer the vertical center of said truck than is said caster or swivel wheel, in order to secure the proper spring-action of said spring-bar, substantially as set forth.

In testimony whereof I affix my signature in presence of two witnesses.

WILLIAM CLOUSER.

Witnesses:
G. C. SELLERS,
EUGENE L. ARNOTT.